(12) United States Patent
Tang et al.

(10) Patent No.: US 11,082,999 B2
(45) Date of Patent: Aug. 3, 2021

(54) METHOD FOR UPLINK SCHEDULING AND DEVICES

(71) Applicant: Guangdong OPPO Mobile Telecommunications Corp., Ltd., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 111 days.

(21) Appl. No.: 16/344,706

(22) PCT Filed: Nov. 2, 2016

(86) PCT No.: PCT/CN2016/104355
§ 371 (c)(1),
(2) Date: Apr. 24, 2019

(87) PCT Pub. No.: WO2018/081955
PCT Pub. Date: May 11, 2018

(65) Prior Publication Data
US 2020/0053751 A1 Feb. 13, 2020

(51) Int. Cl.
*H04W 72/12* (2009.01)
*H04L 5/00* (2006.01)
*H04W 52/02* (2009.01)
*H04W 52/24* (2009.01)

(52) U.S. Cl.
CPC ....... *H04W 72/1268* (2013.01); *H04L 5/0051* (2013.01); *H04W 52/0229* (2013.01); *H04W 52/242* (2013.01); *H04W 72/1226* (2013.01)

(58) Field of Classification Search
None
See application file for complete search history.

(56) References Cited

U.S. PATENT DOCUMENTS

| 2007/0202913 A1* | 8/2007 | Ban | H04W 52/245 |
| | | | 455/522 |
| 2011/0205966 A1* | 8/2011 | Iwai | H04L 5/0007 |
| | | | 370/328 |
| 2011/0235604 A1 | 9/2011 | Inoue et al. | |

(Continued)

FOREIGN PATENT DOCUMENTS

| CN | 104054371 A | 9/2014 |
| CN | 104303477 A | 1/2015 |

(Continued)

OTHER PUBLICATIONS

English Translation of First Chinese Office Action dated May 8, 2020 from Application No. 201680090465.8.
Partial supplementary European search report issued in corresponding European application No. 16920728.9 dated Sep. 12, 2019.
Communication pursuant to Article 94(3) EPC, Examination of EP Application 16920728.9 dated Aug. 25, 2020.

(Continued)

*Primary Examiner* — Alex Skripnikov

(57) ABSTRACT

A method and a device for uplink scheduling are provided. The method includes: a terminal device generates first information according to a downlink reference signal sent by a network device; the terminal device sends the first information to the network device for the network device to determine, according to the first information, a waveform to be adopted by the terminal device for performing uplink transmission.

11 Claims, 4 Drawing Sheets

100

A terminal device generates first information according to a downlink reference signal sent by a network device ~ S110

The terminal device sends the first information to the network device so that the network device determines a waveform to be adopted by the terminal device for performing uplink transmission according to the first information ~ S120

(56) References Cited

U.S. PATENT DOCUMENTS

| | | | |
|---|---|---|---|
| 2013/0039445 A1 | 2/2013 | Hwang | |
| 2014/0016475 A1* | 1/2014 | Zhou | H04W 28/12 370/236 |
| 2015/0208265 A1 | 7/2015 | Dalsgaard et al. | |
| 2018/0035423 A1* | 2/2018 | Wang | H04L 1/0003 |

FOREIGN PATENT DOCUMENTS

| | | |
|---|---|---|
| CN | 106033989 A | 10/2016 |
| EP | 2290890 A1 | 3/2011 |
| JP | 2013153281 A | 8/2013 |
| JP | 2013236289 A | 11/2013 |
| WO | 2009008398 A1 | 1/2009 |
| WO | 2009153978 A1 | 12/2009 |
| WO | 2013022274 A2 | 2/2013 |

OTHER PUBLICATIONS

Japan Notice of Reasons of Refusal with English Translation for JP Application 2019-521470 dated Nov. 4, 2020.
India First Office Action for IN Application 201917009960 dated Dec. 31, 2020.
Communication pursuant to Article 94(3) EPC Application 16920728.9 dated Feb. 1, 2021.
Japan Second Office Action with English Translation for JP Application 2019521470 dated Mar. 5, 2021.
Taiwan First Office Action with English Translation for TW Application 11020170670 dated Feb. 26, 2021.
Communication pursuant to Article 94(3) EPC Examination of EP Application 16920728.9 dated May 11, 2021.

\* cited by examiner

METHOD FOR UPLINK SCHEDULING AND DEVICES

CROSS-REFERENCE TO RELATED APPLICATION(S)

This application is a 371 application of International Application No. PCT/CN2016/104355, filed on Nov. 2, 2016, the entire disclosure of which is hereby incorporated by reference.

TECHNICAL FIELD

Implementations of the present disclosure relate to the communication field, and more particularly, to methods and devices for uplink scheduling.

BACKGROUND

In a future communication system, two kinds of waveforms, i.e., orthogonal frequency division multiplexing (OFDM) and discrete fourier transformation spread orthogonal frequency division multiplexing (DFT-S-OFDM), will be adopted in uplink transmission. This will require that a base station decides, during uplink scheduling, a waveform to be adopted by a terminal device.

Generally, a base station determines the waveform to be adopted by a terminal device by measuring an uplink reference signal sent by the terminal device. However, if the terminal device is in radio resource control connected mode, it will consume a large amount of power of the terminal device to continuously send uplink reference signals for a long time. But if the terminal device does not send the uplink reference signal, the base station cannot track a change of the uplink reference signal of the terminal device in time, which will lead to incorrect scheduling for the uplink.

Therefore, it is needed to provide a method for uplink scheduling to reduce energy consumption of a terminal device, and improve accuracy of uplink scheduling.

SUMMARY

The present disclosure provides methods and devices for uplink scheduling.

In a first aspect, a method for uplink scheduling is provided. The method includes: a terminal device generates first information according to a downlink reference signal sent by a network device; the terminal device sends the first information to the network device, so that the network device determines a waveform to be adopted by the terminal device for performing uplink transmission according to the first information.

According to the method for uplink scheduling of the present application, the terminal device sends the first information generated according to the downlink reference signal to the network device, so that the network device can determine the waveform to be adopted by the terminal device for performing uplink transmission according to the first information, thereby reducing the energy consumption of the terminal device.

In connection with the first aspect, in a first possible implementation of the first aspect, generating, by the terminal device, the first information according to the downlink reference signal sent by the network device, includes: the terminal device generates the first information according to the downlink reference signal and a preset change threshold.

In connection with the first possible implementation of the first aspect, in a second possible implementation of the first aspect, the preset change threshold includes at least one of a first preset power change threshold, a first preset reception quality change threshold, and a first preset path loss change threshold.

In connection with the second possible implementation of the first aspect, in a third possible implementation of the first aspect, generating, by the terminal device, the first information according to the downlink reference signal and the preset change threshold, includes: when the terminal device determines that a decrease value of a receiving power of the downlink reference signal within a first preset time period is greater than or equal to the first preset power change threshold, and/or a decrease value of a reception quality of the downlink reference signal within the first preset time period is greater than or equal to the first preset reception quality change threshold, and/or an increase value of path loss of the downlink reference signal within the first preset time period is greater than or equal to the first preset path loss change threshold, generating, by the terminal device, the first information.

In connection with the third possible implementation of the first aspect, in a fourth possible implementation of the first aspect, the first information is used for indicating that the terminal device moves from a position at a center of a cell to a position at an edge of the cell within the first preset time period.

In connection with the first possible implementation of the first aspect, in a fifth possible implementation of the first aspect, the preset change threshold includes at least one of a second preset power change threshold, a second preset reception quality change threshold, and a second preset path loss change threshold.

In connection with the fifth possible implementation of the first aspect, in a sixth possible implementation of the first aspect, generating, by the terminal device, the first information according to the downlink reference signal and the preset change threshold, includes: when the terminal device determines that an increase value of a receiving power of the downlink reference signal within a second preset time period is greater than or equal to the second preset power change threshold, and/or an increase value of a reception quality of the downlink reference signal within the second preset time period is greater than or equal to the second preset reception quality change threshold, and/or a decrease value of path loss of the downlink reference signal within the second preset time period is greater than or equal to the second preset path loss change threshold, generating, by the terminal device, the first information.

In connection with the sixth possible implementation of the first aspect, in a seventh possible implementation of the first aspect, the first information is used for indicating that the terminal device moves from a position at an edge of a cell to a position at a center of the cell within the second preset time period.

In connection with the first aspect, or any of the first to seventh possible implementations of the first aspect, in an eighth possible implementation of the first aspect, sending, by the terminal device, the first information to the network device, includes: the terminal device sends the first information to the network device through an uplink control channel.

In connection with the eighth possible implementation of the first aspect, in a ninth possible implementation of the first aspect, sending, by the terminal device, the first information to the network device, through the uplink control channel, includes: the terminal device sends the first information to the network device through an uplink control channel corresponding to preconfigured uplink control channel resources.

In connection with the first aspect, or any one of the first to ninth possible implementations of the first aspect, in a tenth possible implementation of the first aspect, after the terminal device sends the first information to the network device, the method further includes: the terminal device receives second information sent by the network device, and the second information is used for instructing the terminal device to transmit an uplink reference signal to the network device; the terminal device sends the uplink reference signal to the network device according to the second information.

In a second aspect, a method for uplink scheduling is provided. The method includes: a network device receives first information sent by a terminal device, and the first information is generated by the terminal device according to a downlink reference signal sent by the network device; the network device determines a waveform to be adopted by the terminal device for performing uplink transmission.

According to the method for uplink scheduling of the present application, the network device receives the first information generated by the terminal device according to the downlink reference signal and determines the waveform to be adopted by the terminal device for performing uplink transmission according to the first information, thereby reducing the energy consumption of the terminal device.

In connection with the second aspect, in a first possible implementation of the second aspect, the first information is generated by the terminal device according to the downlink reference signal and a preset change threshold.

In connection with the first possible implementation of the second aspect, in a second possible implementation of the second aspect, the preset change threshold includes at least one of a first preset power change threshold, a first preset reception quality change threshold, and a first preset path loss change threshold.

In connection with the second possible implementation of the second aspect, in a third possible implementation of the second aspect, the first information is generated by the terminal device when determining that a decrease value of a receiving power of the downlink reference signal within a first preset time period is greater than or equal to the first preset power change threshold, and/or a decrease value of a reception quality of the downlink reference signal within the first preset time period is greater than or equal to the first preset reception quality change threshold, and/or an increase value of path loss of the downlink reference signal within the first preset time period is greater than or equal to the first preset path loss change threshold.

In connection with the third possible implementation of the second aspect, in a fourth possible implementation of the second aspect, the first information is used for indicating that the terminal device moves from a position at a center of a cell to a position at an edge of the cell within the first preset time period.

In connection with the first possible implementation of the second aspect, in a fifth possible implementation of the second aspect, the preset change threshold includes at least one of a second preset power change threshold, a second preset reception quality change threshold, and a second preset path loss change threshold.

In connection with the fifth possible implementation of the second aspect, in a sixth possible implementation of the second aspect, the first information is generated by the terminal device when determining that an increase value of a receiving power of the downlink reference signal within a second preset time period is greater than or equal to the second preset power change threshold, and/or an increase value of a reception quality of the downlink reference signal within the second preset time period is greater than or equal to the second preset reception quality change threshold, and/or a decrease value of path loss of the downlink reference signal within the second preset time period is greater than or equal to the second preset path loss change threshold In connection with the sixth possible implementation of the second aspect, in a seventh possible implementation of the second aspect, the first information is used for indicating that the terminal device moves from a position at an edge of a cell to a position at a center of the cell within the second preset time period.

In connection with the second aspect, or any one of the first to seventh possible implementations of the second aspect, in an eighth possible implementation of the second aspect, receiving, by the network device, the first information sent by the terminal device, includes: the network device receives the first information sent by the terminal device through an uplink control channel.

In connection with the eighth possible implementation of the second aspect, in a ninth possible implementation of the second aspect, receiving, by the network device, the first information sent by the terminal device through the uplink control channel, includes: the network device receives the first information sent by the terminal device through an uplink control channel corresponding to preconfigured uplink control channel resources.

In connection with the second aspect, or any one of the first to ninth possible implementations of the second aspect, in a tenth possible implementation of the second aspect, determining, by the network device, the waveform to be adopted by the terminal device for performing the uplink transmission according to the first information, includes: the network device sends second information to the terminal device according to the first information, and the second information is used for instructing the terminal device to send an uplink reference signal to the network device; the network device receives the uplink reference signal sent by the terminal device; the network device determines the waveform to be adopted by the terminal device for performing the uplink transmission.

In a third aspect, a method for uplink scheduling is provided. The method includes: a terminal device receives a downlink reference signal sent by a network device; the terminal device sends an uplink reference signal to the network device according to the downlink reference signal and a preset change threshold.

According to the method for uplink scheduling of the present application, the terminal device sends the uplink reference signal to the network device according to the received downlink reference signal and the preset change threshold. Therefore, it is not necessary for the terminal device to continuously send uplink reference signals to the network device, the energy consumption of the terminal device is reduced, the network device can track the change of the uplink reference signal of the terminal device in time, and the accuracy of uplink scheduling is improved.

In connection with the third aspect, in a first possible implementation of the third aspect, the preset change threshold includes at least one of a first preset power change threshold, a first preset reception quality change threshold, and a first preset path loss change threshold.

In connection with the first possible implementation of the third aspect, in a second possible implementation of the third aspect, sending, by the terminal device, the uplink reference signal to the network device according to the downlink reference signal and the preset change threshold, includes:

when determining that a decrease value of a receiving power of the downlink reference signal within a first preset time period is greater than or equal to the first preset power change threshold, and/or a decrease value of a reception quality of the downlink reference signal within the first preset time period is greater than or equal to the first preset reception quality change threshold, and/or an increase value of path loss of the downlink reference signal within the first preset time period is greater than or equal to first preset path loss change threshold, the terminal device sends the uplink reference signal to the network device.

In connection with the first or second possible implementation of the third aspect, in a third possible implementation of the third aspect, before sending the uplink reference signal to the network device, the method further includes: the terminal device sends first information to the network device, and the first information is used for the network device to determine a time for receiving the uplink reference signal according to the first information.

In connection with the third aspect, in a fourth possible implementation of the third aspect, the preset change threshold includes at least one of a second preset power change threshold, a second preset reception quality change threshold, and a second preset path loss change threshold.

In connection with the fourth possible implementation of the third aspect, in a fifth possible implementation of the fourth aspect, sending, by the terminal device the uplink reference signal to the network device according to the downlink reference signal and the preset change threshold, includes: when determining that an increase value of a receiving power of the downlink reference signal within a second preset time period is greater than or equal to the second preset power change threshold, and/or an increase value of a reception quality of the downlink reference signal within the second preset time period is greater than or equal to the second preset reception quality change threshold, and/or a decrease value of path loss of the downlink reference signal within the second preset time period is greater than or equal to the second preset path loss change threshold, the terminal device sends the uplink reference signal to the network device.

In connection with the fourth or fifth possible implementation of the third aspect, in a sixth possible implementation of the third aspect, before sending the uplink reference signal to the network device, the method further includes: the terminal device sends second information to the network device, and the second information is used for the network device to determine a time for receiving the uplink reference signal according to the second information.

In connection with the third aspect, or any one of the first to sixth possible implementations of the third aspect, in a seventh possible implementation of the third aspect, sending the uplink reference signal to the network device includes: sending the uplink reference signal to the network device through preconfigured reference signal resources.

In a fourth aspect, a method for uplink scheduling is provided. The method includes: a network device sends a downlink reference signal to a terminal device; the network device receives an uplink reference signal sent by the terminal device according to the downlink reference signal and a preset change threshold; the network device determines a waveform to be adopted by the terminal device for performing uplink transmission.

According to the method for uplink scheduling of the present application, the network device receives the uplink reference signal sent by the terminal device according to the downlink reference signal and the preset change threshold, and determines the waveform to be adopted by the terminal device for performing the uplink transmission according to the uplink reference signal. Therefore, it is not necessary for the terminal device to continuously send uplink reference signals to the network device, the energy consumption of the terminal device is reduced, the network device can track the change of the uplink reference signal of the terminal device in time, and the accuracy of the uplink scheduling is improved.

In connection with the fourth aspect, in a first possible implementation of the fourth aspect, the preset change threshold includes at least one of a first preset power change threshold, a first preset reception quality change threshold, and a first preset path loss change threshold.

In connection with the first possible implementation of the fourth aspect, in a second possible implementation of the fourth aspect, receiving, by the network device, the uplink reference signal sent by the terminal device according to the downlink reference signal and the preset change threshold, includes: the network device receives the uplink reference signal sent by the terminal device when the terminal device determines that a decrease value of a receiving power of the downlink reference signal within a first preset time period is greater than or equal to the first preset power change threshold, and/or a decrease value of a reception quality of the downlink reference signal within the first preset time period is greater than or equal to the first preset reception quality change threshold, and/or an increase value of path loss of the downlink reference signal within the first preset time period is greater than or equal to first preset path loss change threshold.

In connection with the first or second possible implementation of the fourth aspect, in a third possible implementation of the fourth aspect, before the network device receives the uplink reference signal sent by the terminal device according to the downlink reference signal and the preset change threshold, the method further includes: the network device receives first information sent by the terminal device, and the first information is used for the network device to determine a time for receiving the uplink reference signal according to the first information.

In connection with the fourth aspect, in a fourth possible implementation of the fourth aspect, the preset change threshold includes a second preset power change threshold, a second preset reception quality change threshold, and a second preset path loss change threshold.

In connection with the fourth possible implementation of the fourth aspect, in a fifth possible implementation of the fourth aspect, receiving, by the network device, the uplink reference signal sent by the terminal device according to the downlink reference signal and the preset change threshold, includes: the network device receives the uplink reference signal sent by the terminal device when the terminal device determines that an increase value of a receiving power of the downlink reference signal within a second preset time period is greater than or equal to the second preset power change threshold, and/or an increase value of a reception quality of the downlink reference signal within the second preset time period is greater than or equal to the second preset reception quality change threshold, and/or a decrease value of path loss of the downlink reference signal within the second preset time period is greater than or equal to the second preset path loss change threshold.

In connection with the fourth or fifth possible implementation of the fourth aspect, in a sixth possible implementation of the fourth aspect, before the network device receives the uplink reference signal sent by the terminal device according to the downlink reference signal and the preset change threshold, the method further includes: the network device receives second information sent by the terminal device, and the second information is used for the network device to determine a time for receiving the uplink reference signal according to the second information.

In connection with the fourth aspect, or any of the first to sixth possible implementations of the fourth aspect, in a seventh possible implementation of the fourth aspect, receiving, by the network device, the uplink reference signal sent by the terminal device according to the downlink reference signal and the preset change threshold, includes: the network device receives the uplink reference signal sent by the terminal device through preconfigured reference signal resources according to the downlink reference signal and the preset change threshold.

In a fifth aspect, a terminal device is provided. The terminal is used for performing the method in the above first aspect or any one of the possible implementations of the first aspect. Specifically, the terminal device includes modules for performing the method in the above first aspect or any one of the possible implementations of the first aspect.

In a sixth aspect, a network device is provided. The network device is used for performing the method in the above second aspect or any one of the possible implementations of the second aspect. Specifically, the network device includes functional modules for performing the method in the above second aspect or any one of the possible implementation of the second aspect.

In a seventh aspect, a terminal device is provided. The terminal device is used for performing the method in the above third aspect or any one of the possible implementation of the third aspect. Specifically, the terminal device includes functional modules for performing the method in the above third aspect or any one of the possible implementation of the third aspect.

In an eighth aspect, a network device is provided. The network device is used for performing the method in the above fourth aspect or any one of the possible implementations of the fourth aspect. Specifically, the network device includes functional modules for performing the method in the above fourth aspect or any one of the possible implementations of the fourth aspect.

In a ninth aspect, a terminal device is provided. The terminal device includes a processor, a memory and a transceiver. The processor, the memory, and the transceiver are connected through a bus system, the memory is used for storing instructions, and the processor is used for calling the instructions stored in the memory to control the transceiver to receive or send information, so that the terminal device performs the method in the above first aspect or any one of the possible implementations of the first aspect.

In a tenth aspect, a network device is provided. The network device includes a processor, a memory and a transceiver. The processor, the memory and the transceiver are connected through a bus system, the memory is used for storing instructions, and the processor is used for calling the instructions stored in the memory to control the transceiver to receive or send information, so that the network device performs the method in the above second aspect or any one of the possible implementations of the second aspect.

In an eleventh aspect, a terminal device is provided. The terminal device includes a processor, a memory and a transceiver. The processor, the memory and the transceiver are connected through a bus system, the memory is used for storing instructions, and the processor is used for calling the instructions stored in the memory to control the transceiver to receive or send information, so that the terminal device performs the method in the above third aspect or any one of the possible implementations of the third aspect.

In a twelfth aspect, a network device is provided. The network device includes a processor, a memory and a transceiver. The processor, the memory and the transceiver are connected through a bus system, the memory is used for storing instructions, and the processor is used for calling the instructions stored in the memory to control the transceiver to receive or send information, so that the network device performs method in the above fourth aspect or any one of the possible implementations of the fourth aspect.

In a thirteenth aspect, a computer readable medium is provided. The computer readable medium is used for storing a computer program that includes instructions for performing the method in the above first aspect or any one of the possible implementations of the first aspect.

In a fourteenth aspect, a computer readable medium is provided. The computer readable medium is used for storing a computer program that includes instructions for performing the method in the above second aspect or any one of the possible implementations of the second aspect.

In a fifteenth aspect, a computer readable medium is provided. The computer readable medium is used for storing a computer program that includes instructions for performing the method in the above third aspect or any one of the possible implementations of the third aspect.

In a sixteenth aspect, a computer readable medium is provided. The computer readable medium is used for storing a computer program that includes instructions for performing the method in the above second aspect or any one of the possible implementations of the second aspect.

DETAILED DESCRIPTION

The technical solutions in the implementations of the present disclosure will be described clearly and completely in the following with reference to the drawings in the implementations of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a long term evolution (LTE) system, a LTE Frequency Division Duplex (FDD) system, a LTE Time Division Duplex (TDD) system, a Universal Mobile Telecommunication System (UMTS) or a Worldwide Interoperability for Microwave Access (WiMAX) communication system, a 5G system, or a new radio (NR) system.

In implementations of the present disclosure, the terms "network" and "system" are often used interchangeably, but those skilled in the art can understand their meaning. The terminal devices involved in the implementations of the present disclosure may include various handheld devices with wireless communication functions, vehicle-mounted devices, wearable devices, computing devices or other processing devices connected to wireless modems, as well as various forms of user equipment (UE), mobile stations (MS), or terminals, etc. For convenience of description, in implementations of the present disclosure, the above-mentioned devices are collectively referred to as terminal devices.

In implementations of the present disclosure, a network device may be a device for communicating with a terminal device, and may be an evolutional NodeB in an LTE system (eNB or eNodeB), or the network device may be a relay station, an access point, an on-board device, a wearable device, a network device in a future 5G network, or a network device in a future evolved public land mobile network (PLMN), etc.

Figure 1:
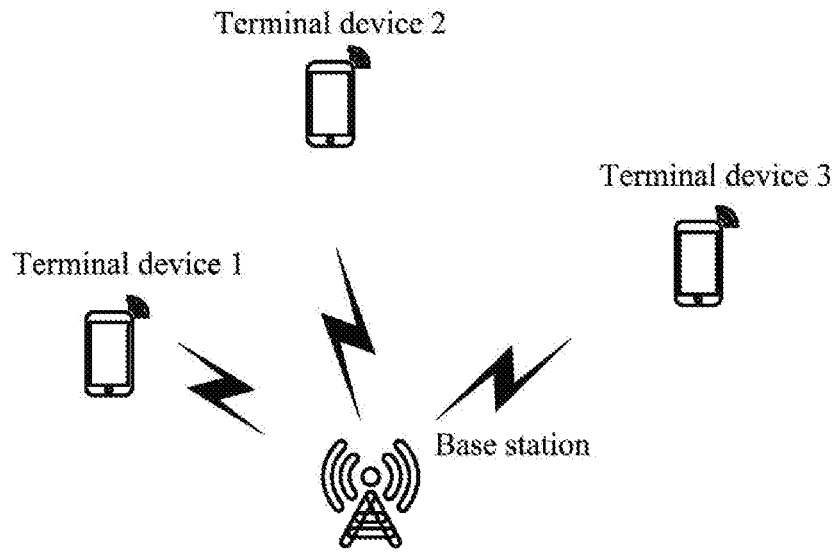
FIG. 1 is a schematic diagram of a communication system to which a communication method according to an implementation of the present disclosure is applied.

FIG. 1 is a schematic diagram of an application scenario according to an implementation of the present disclosure. As shown in FIG. 1, a base station communicates with a plurality of terminal devices (terminal devices 1 to 3) through wireless signals. Generally a wireless signal for communication is sent and received in a particular modulation mode, and modulation modes may be divided into two categories: single-carrier modulation and multi-carrier modulation.

It should be noted that, only one base station (isolated base station) is shown in the application scenario shown in FIG. 1. However, the present disclosure is not limited to this. The base station may also have neighboring base stations and terminal devices that transmit services on the same or different time-frequency resources, and a coverage range of each base station may include another quantity of terminal devices.

Optionally, the wireless communication system in which the base station and the terminal devices are located in FIG. 1 may include other network entities such as a network controller, a mobile management entity, and the implementations of the present disclosure are not limited thereto.

It should be explained that, in the process of describing an implementation of the present disclosure, downlink transmission refers to a relevant process of sending, by a network device, information to a terminal device, and uplink transmission refers to a relevant process of sending, by a terminal device, information to a network device.

Figure 2:
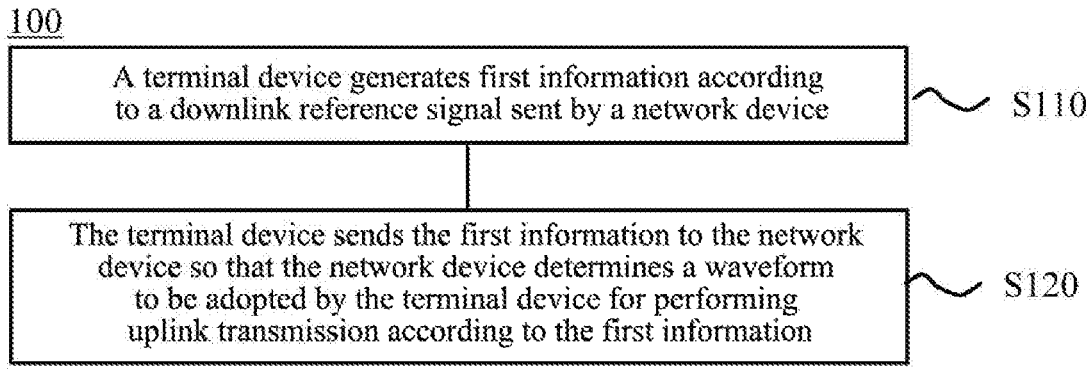
FIG. 2 is a schematic flowchart of a method for uplink scheduling according to an implementation of the present disclosure.

FIG. 2 is a schematic flowchart of a method for uplink scheduling according to an implementation of the present disclosure. As shown in FIG. 2, the method 100 includes S110 and S120.

In S110, a terminal device generates first information according to a downlink reference signal sent by a network device.

In S120, the terminal device sends the first information to the network device, so that the network device can determine a waveform to be adopted by the terminal device for performing uplink transmission according to the first information.

Specifically, after receiving the downlink reference signal sent by the network device, the terminal device generates the first information according to the downlink reference signal and sends the first information to the network device, so that the network device determines the waveform to be adopted by the terminal device for performing uplink transmission according to the first information.

Therefore, it is not necessary for the terminal device to generate an uplink reference signal to the network device, and the network device can determine the waveform to be adopted by the terminal device for performing uplink transmission only based on the first information sent by the terminal device, thereby reducing the energy consumption of the terminal device.

In an implementation of the present disclosure, optionally, the terminal device generates the first information according to the downlink reference signal and a preset change threshold. The preset change threshold may be a value specified by a protocol implementation, or the preset change threshold may be a value configured by the network device through a signaling.

Optionally, as an example, the preset change threshold includes at least one of a first preset power change threshold, a first preset reception quality change threshold, and a first preset path loss change threshold.

Specifically, when the terminal device determines that a decrease value of a receiving power of the downlink reference signal within a first preset time period is greater than or equal to the first preset power change threshold, and/or a decrease value of a reception quality of the downlink reference signal within the first preset time period is greater than or equal to the first preset reception quality change threshold, and/or an increase value of path loss of the downlink reference signal within the first preset time period is greater than or equal to the first preset path loss change threshold, the terminal device generates the first information.

Correspondingly, the first information may include a measurement result of the terminal device. For example, the first information may include a variation of a receiving power of the downlink reference signal within the first preset time period, or a measurement value of the downlink reference signal at a start time of the first preset time period and a measurement value at an end time of the first preset time period. The first information may include a variation of the reception quality of the downlink reference signal within the first preset time period, or a measurement value of the reception quality of the downlink reference signal at a start time of the first preset time period and a measurement value of the reception quality of the downlink reference signal at an end time of the first preset time period. The first information may include a variation of the path loss of the downlink reference signal within the first preset time period, or a measurement value of the path loss of the downlink reference signal at a start time of the first preset time period and a measurement value of the path loss of the downlink reference signal at an end time of the first preset time period. The first information may include a change speed of the receiving power of the downlink reference signal within the first preset time period, and/or a change speed of the reception quality of the downlink reference signal within the first preset time period, and/or a change speed of the path loss of the downlink reference signal within the first preset time period. The network device may determine a moving direction of the terminal device in a cell according to content in the first information.

Or, the first information directly indicates that the terminal device moves from a position at a center of a cell to a position at an edge of the cell within the first preset time period.

Then, after the network device determines that the terminal device moves from the position at the center of the cell to the position at the edge of the cell within the first preset time period according to the first information, the network device may determine that a waveform adopted by the terminal device in uplink transmission needs to be converted from an orthogonal frequency division multiplexing (OFDM) waveform to an discrete fourier transformation spread orthogonal frequency division multiplexing waveform (DFT-S-OFDM).

Optionally, as another example, the preset change threshold includes at least one of a second preset power change threshold, a second preset reception quality change threshold, and a second preset path loss change threshold.

Specifically, when determining that an increase value of a receiving power of the downlink reference signal within a second preset time period is greater than or equal to the second preset power change threshold, and/or an increase value of a reception quality of the downlink reference signal within the second preset time period is greater than or equal to the second preset reception quality change threshold, and/or a decrease value of path loss of the downlink reference signal within the second preset time period is greater than or equal to the second preset path loss change threshold, the terminal device generates the first information.

Similarly, the first information may include a variation of the receiving power of the downlink reference signal within the second preset time period, or a measurement value of the downlink reference signal at a start time of the second preset time period and a measurement value at an end time of the second preset time period. The first information may include a variation of the reception quality of the downlink reference signal within the second preset time period, or a measurement value of the reception quality of the downlink reference signal at a start time of the second preset time period and a measurement value of the reception quality of the downlink reference signal at an end time of the second preset time period. The first information may include a variation of the path loss of the downlink reference signal within the second preset time period, or a measurement value of the path loss of the downlink reference signal at a start time of the second preset time period and a measurement value of the path loss of the downlink reference signal at an end time of the second preset time period. The first information may include a change speed of the receiving power of the downlink reference signal within the second preset time period, and/or a change speed of the reception quality of the downlink reference signal within the second preset time period, and/or a change speed of the path loss of the downlink reference signal within the second preset time period. The network device may determine a moving direction of the terminal device in a cell according to content in the first information.

Or, the first information directly indicates that the terminal device moves from a position at an edge of a cell to a position at a center of the cell within the first preset time period.

Then, after the network device determines that the terminal device moves from the edge position of the cell to the center position of the cell within the second preset time period according to the first information, the network device may determine that a waveform adopted by the terminal device in uplink transmission needs to be converted from a DFT-S-OFDM waveform to an OFDM waveform.

In an implementation of the present disclosure, the network device may configure that the first preset power change threshold is equal to the second preset power change threshold, or may configure that the first preset power change threshold is not equal to the second preset power change threshold. The network device may configure that the first preset reception quality change threshold is equal to the second preset reception quality change threshold, or may configure that the first preset reception quality change threshold is not equal to the second preset reception quality change threshold. The network device may configure that the first preset path loss change threshold is equal to the second preset path loss change threshold, or may configure that the first preset path loss change threshold is not equal to the second preset path loss change threshold.

In an implementation of the present disclosure, optionally, the terminal device sends the first information to the network device through an uplink control channel.

Optionally, the network device uses a dedicated signaling to preconfigure uplink control channel resources for the terminal device, and the terminal device sends the first information to the network device through the preconfigured uplink control channel resources after generating the first information.

In an implementation of the present disclosure, optionally, after the network device receives the first information sent by the terminal device, the network device may configure the terminal device to send an uplink reference signal, determine a state of the uplink channel by measuring the uplink reference signal, and determine the waveform to be adopted by the terminal device for performing uplink transmission.

Or, it can be understood that although the network device may already know from a report of the terminal device that the terminal device is located in the center or edge area of the cell, if the terminal device is in an area between the center and the edge area of the cell, the network device still needs to measure an uplink reference signal sent by the terminal device to determine an uplink waveform adopted by the terminal device.

Specifically, after the terminal device sends the first information to the network device, the terminal device receives second information sent by the network device, and the second information is used for instructing the terminal device to send an uplink reference signal to the network device. The terminal device sends the uplink reference signal to the network device according to the second information.

In the above implementations, the first preset time period and/or the second preset time period may be periodic time periods preconfigured by the network device. When configuring the first preset time period and/or the second preset time period, the network device may specifically indicate a start time and an end time of each time period, may indicate a start time and a duration of each time period, or may specifically indicate a start time and a duration of a first period and an interval between start times of two adjacent time periods.

The method for uplink scheduling according to the implementation of the present disclosure has been described in detail above from the terminal device side in conjunction with FIG. 2, and a method for uplink scheduling according to an implementation of the present disclosure will be described in detail below from a network device side in conjunction with FIG. 3. It will be understood that the interaction between the network device and the terminal device described from the terminal device side is the same as that described from the network device side, and relevant descriptions will be omitted as appropriate in order to avoid duplication.

Figure 3:
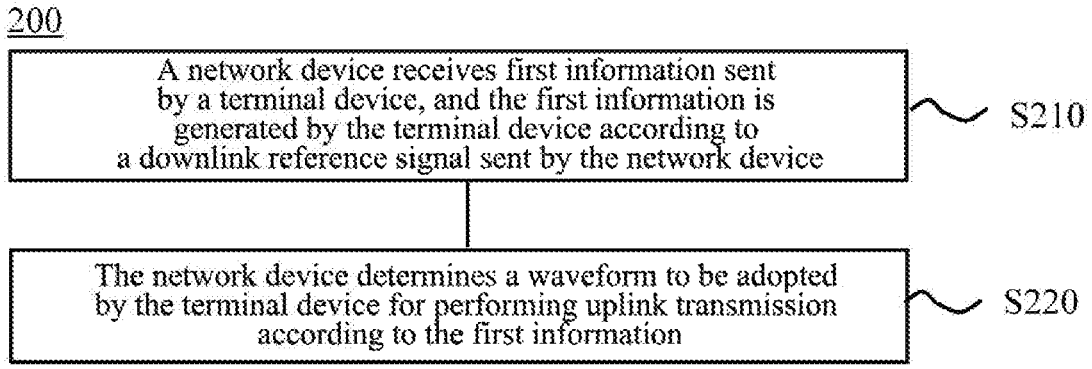
FIG. 3 is a schematic flowchart of a method for uplink scheduling according to another implementation of the present disclosure.

FIG. 3 is a schematic flowchart of a method for uplink scheduling according to another implementation of the present disclosure. As shown in FIG. 3, the method 200 includes S210 and S220.

In S210, a network device receives first information sent by a terminal device, and the first information is generated by the terminal device according to a downlink reference signal sent by the network device.

In S220, the network device determines a waveform to be adopted by the terminal device for performing uplink transmission according to the first information.

Therefore, according to the method for uplink scheduling of the implementation of the present disclosure, the network device receives the first information generated by the terminal device according to the downlink reference signal and determines the waveform that the terminal device needs to adopt for performing uplink transmission according to the first information, so that the terminal device does not need to send the uplink reference signal to the network device, and the energy consumption of the terminal device can be reduced.

In an implementation of the present disclosure, optionally, the first information is generated by the terminal device according to the downlink reference signal and a preset change threshold.

In an implementation of the present disclosure, optionally, the preset change threshold includes at least one of a first preset power change threshold, a first reception quality change threshold, and a first preset path loss change threshold.

In an implementation of the present disclosure, optionally, the first information is generated by the terminal device when determining that a decrease value of a receiving power of the downlink reference signal within a first preset time period is greater than or equal to the first preset power change threshold, and/or a decrease value of a reception quality of the downlink reference signal within the first preset time period is greater than or equal to the first preset reception quality change threshold, and/or an increase value of path loss of the downlink reference signal within the first preset time period is greater than or equal to first preset path loss change threshold.

In an implementation of the present disclosure, optionally, the first information is used for indicating that the terminal device moves from a position at a center of a cell to a position at an edge of the cell within the first preset time period.

In an implementation of the present disclosure, optionally, the preset change threshold includes at least one of a second preset power change threshold, a second preset reception quality change threshold, and a second preset path loss change threshold.

In an implementation of the present disclosure, optionally, the first information is generated by the terminal device when determining that an increase value of a receiving power of the downlink reference signal within a second preset time period is greater than or equal to the second preset power change threshold, and/or an increase value of a reception quality of the downlink reference signal within the second preset time period is greater than or equal to the second preset reception quality change threshold, and/or a decrease value of path loss of the downlink reference signal within the second preset time period is greater than or equal to the second preset path loss change threshold.

In an implementation of the present disclosure, optionally, the first information is used for indicating that the terminal device moves from a position at an edge of a cell to a position at a center of the cell within the second preset time period.

In an implementation of the present disclosure, optionally, in S210, receiving, by the network device, the first information sent by the terminal device includes: the network device receives the first information sent by the terminal device through an uplink control channel.

In an implementation of the present disclosure, optionally, in S210, receiving, by the network device, the first information sent by the terminal device through the uplink control channel includes: the network device receives the first information sent by the terminal device through an uplink control channel corresponding to preconfigured uplink control channel resources.

Figure 4:
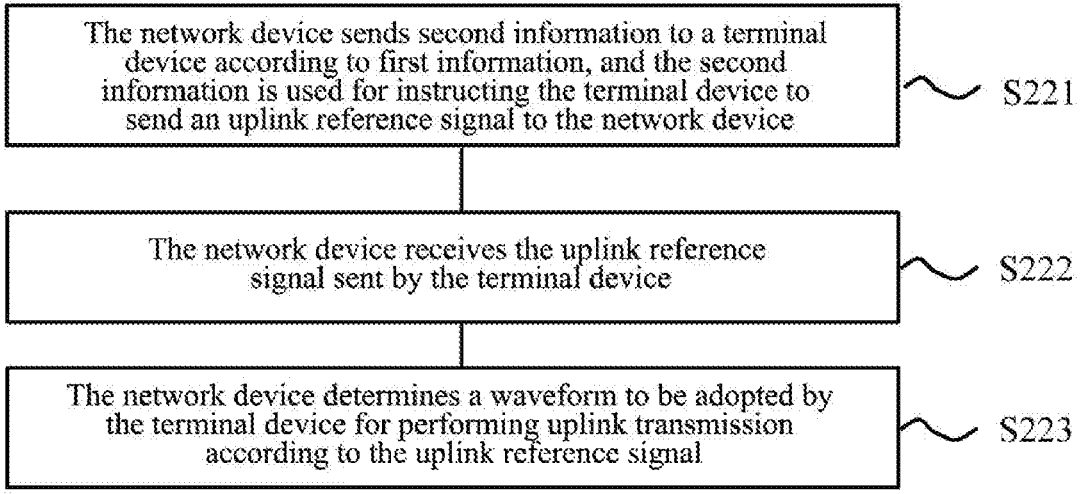
FIG. 4 is another schematic flowchart of a method for uplink scheduling according to another implementation of the present disclosure.

In an implementation of the present disclosure, optionally, as shown in FIG. 4, S220 specifically includes S221-S223.

In S221, the network device sends second information to the terminal device according to the first information, and the second information is used for instructing the terminal device to send an uplink reference signal to the network device.

In S222, the network device receives the uplink reference signal sent by the terminal device.

In S223, the network device determines a waveform to be adopted by the terminal device for performing uplink transmission according to the uplink reference signal.

Figure 5:
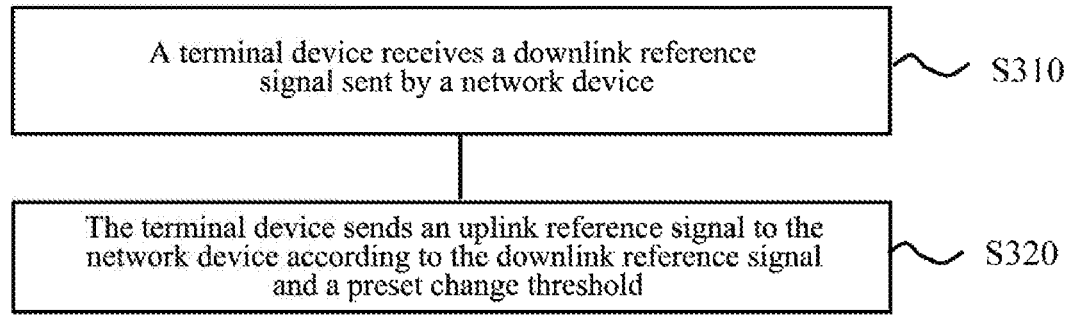
FIG. 5 is a schematic flowchart of a method for uplink scheduling according to yet another implementation of the present disclosure.

FIG. 5 is a schematic flowchart of a method for uplink scheduling according to yet another implementation of the present disclosure. As shown in FIG. 5, the method 300 includes S310 and S320.

In S310, a terminal device receives a downlink reference signal sent by a network device.

In S320, the terminal device sends an uplink reference signal to the network device according to the downlink reference signal and a preset change threshold.

Therefore, according to the method for uplink scheduling in the implementation of the present disclosure, the terminal device sends the uplink reference signal to the network device according to the received downlink reference signal and the preset change threshold. Therefore, it is not necessary for the terminal device to continuously send uplink reference signals to the network device, the energy consumption of the terminal device is reduced, the network device can track the change of the uplink reference signal of the terminal device in time, and the accuracy of uplink scheduling is improved.

In an implementation of the present disclosure, optionally, the preset change threshold includes at least one of a first preset power change threshold, a first preset reception quality change threshold, and a first preset path loss change threshold.

Specifically, when determining that a decrease value of a receiving power of the downlink reference signal within a first preset time period is greater than or equal to the first preset power change threshold, and/or a decrease value of a reception quality of the downlink reference signal within the first preset time period is greater than or equal to the first preset reception quality change threshold, and/or an increase value of path loss of the downlink reference signal within the first preset time period is greater than or equal to first preset path loss change threshold, the terminal device sends the uplink reference signal to the network device.

In an implementation of the present disclosure, optionally, before the terminal device sends the uplink reference signal to the network device, the terminal device sends first information to the network device, and the first information is used for the network device to determine a time for receiving the uplink reference information according to the first information.

Or, it can be understood that the terminal device sends the first information to the network device to inform the network device that the terminal device will send an uplink reference signal. Therefore, the network device is not required to perform blind detection on the uplink reference signal, and the complexity of the base station is reduced.

Optionally, the first information includes a specific measurement result of the downlink reference signal by the terminal device. Specifically, the first information may include the content included in the first information corresponding to the situation when the preset change threshold includes at least one of a first preset power change threshold, a first preset reception quality change threshold, and a first preset path loss change threshold in the method 100. For brevity, it will not be described here.

In an implementation of the present disclosure, optionally, the preset change threshold includes at least one of a second preset power change threshold, a second preset reception quality change threshold, and a second preset path loss change threshold.

Specifically, when determining that an increase value of a receiving power of the downlink reference signal within a second preset time period is greater than or equal to the second preset power change threshold, and/or an increase value of a reception quality of the downlink reference signal within the second preset time period is greater than or equal to the second preset reception quality change threshold, and/or a decrease value of path loss of the downlink reference signal within the second preset time period is greater than or equal to the second preset path loss change threshold, the terminal device sends the uplink reference signal.

Similarly, before the terminal device sends the uplink reference signal to the network device, the terminal device sends second information to the network device, and the second information is used for the network device to determine a time for receiving the uplink reference information according to the second information.

Or it can be understood that the terminal device sends the second information to the network device to inform the network device that the terminal device will send the uplink reference signal. Therefore, the network device is not required to perform blind detection on the uplink reference signal, and the complexity of the base station is reduced.

Optionally, the second information includes a specific measurement result of the downlink reference signal by the terminal device. Specifically, the second information may include the content included in the first information corresponding to the situation when the preset change threshold includes at least one of the second preset power change threshold, the second preset reception quality change threshold, and the second preset path loss change threshold in the method 100. For brevity, it will not be described here.

In the above implementation, optionally, the terminal device sends the uplink reference signal to the network device through preconfigured reference signal resources.

Specifically, the network device may allocate resources for the terminal device to transmit the uplink reference signal through a dedicated signaling, and when the terminal device determines that the uplink reference signal needs to be sent, the terminal device sends the uplink reference signal to the network device on the preconfigured resources used for sending the uplink reference signal.

It should be understood that the first preset power change threshold in the method 300 may be greater than or equal to the first preset power change threshold in the method 100 and the first preset power change threshold in the method 200, the first preset reception quality change threshold in the method 300 may be greater than or equal to the first preset reception quality change threshold in the method 100 and the first preset reception quality change threshold in the method 200, and the first preset path loss change threshold in the method 300 may be greater than or equal to the first preset path loss change threshold in the method 100 and the first preset path loss change threshold in the method 200.

It should be understood that the second preset power change threshold in the method 300 may be greater than or equal to the second preset power change threshold in the method 100 and the second preset power change threshold in the method 200, the second preset reception quality change threshold in the method 300 may be greater than or equal to the second preset reception quality change threshold in the method 100 and the second preset reception quality change threshold in the method 200, and the second preset path loss change threshold in the method 300 may be greater than or equal to the second preset path loss change threshold in the method 100 and the second preset path loss change threshold in the method 200.

Moreover, the first preset time period and/or the second preset time period may be periodic time periods preconfigured by the network device. When configuring the first preset time period and/or the second preset time period, the network device may specifically indicate a start time and an end time of each time period, may indicate a start time and a duration of each time period, or may specifically indicate a start time and a duration of a first time period and an interval between start times of two adjacent time periods.

The method for uplink scheduling according to the implementation of the present disclosure has been described in detail above from the terminal device side in conjunction with FIG. 5, and a method for uplink scheduling according to an implementation of the present disclosure will be described in detail below from a network device side in conjunction with FIG. 6. It will be understood that the interaction between the network device and the terminal device described from the terminal device side is the same as that described from the network device side, and relevant descriptions will be omitted as appropriate in order to avoid duplication.

Figure 6:
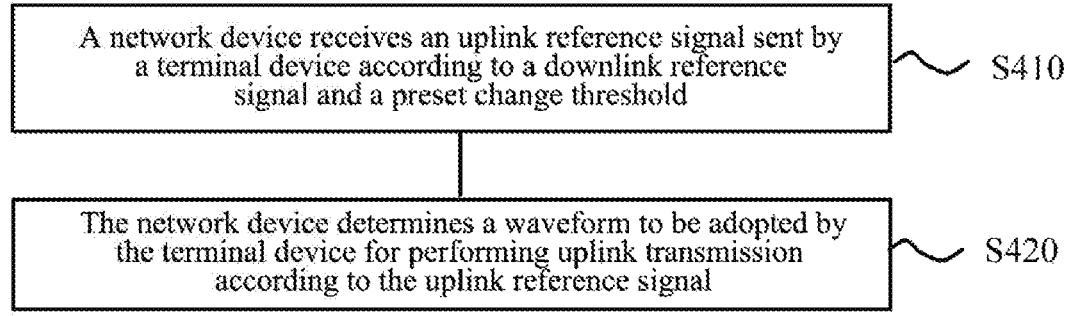
FIG. 6 is a schematic flowchart of a method for uplink scheduling according to yet another implementation of the present disclosure.

FIG. 6 is a schematic flowchart of a method for uplink scheduling according to yet another implementation of the present disclosure. As shown in FIG. 6, the method 400 includes S410-S430.

In S410, a network device sends a downlink reference signal to a terminal device.

In S420, the network device receives an uplink reference signal sent by the terminal device according to the downlink reference signal and a preset change threshold.

In S430, the network device determines a waveform to be adopted by the terminal device for performing uplink transmission according to the uplink reference signal.

Therefore, according to the method for uplink scheduling in the implementation of the present disclosure, the network device receives the uplink reference signal sent by the terminal device according to the downlink reference signal and the preset change threshold, and determines the waveform to be adopted by the terminal device for uplink transmission according to the uplink reference signal. Therefore, it is not necessary for the terminal device to continuously send uplink reference signals to the network device, the energy consumption of the terminal device is reduced, and the network device can track the change of the uplink reference signal of the terminal device in time, thus improving the accuracy of the uplink scheduling.

In an implementation of the present disclosure, optionally, the preset change threshold includes at least one of a first preset power change threshold, a first preset reception quality change threshold, and a first preset path loss change threshold.

In an implementation of the present disclosure, optionally, S420 specifically includes: the network device receives the uplink reference signal sent by the terminal device when the terminal device determines that a decrease value of a receiving power of the downlink reference signal within a first preset time period is greater than or equal to the first preset power change threshold, and/or a decrease value of a reception quality of the downlink reference signal within the first preset time period is greater than or equal to the first preset reception quality change threshold, and/or an increase value of path loss of the downlink reference signal within the first preset time period is greater than or equal to first preset path loss change threshold.

In an implementation of the present disclosure, optionally, before the network device receives the uplink reference signal sent by the terminal device according to the downlink reference signal and the preset change threshold, the method 400 further includes: the network device receives the first information sent by the terminal device, and the first information is used for the network device to determine a time for receiving the uplink reference signal according to the first information.

In an implementation of the present disclosure, optionally, the preset change threshold includes a second preset power change threshold, a second preset reception quality change threshold, and a second preset path loss change threshold.

In an implementation of the present disclosure, optionally, S420 specifically includes: the network device receives the uplink reference signal sent by the terminal device when the terminal device determines that an increase value of a receiving power of the downlink reference signal within a second preset time period is greater than or equal to the second preset power change threshold, and/or an increase value of a reception quality of the downlink reference signal within the second preset time period is greater than or equal to the second preset reception quality change threshold, and/or a decrease value of path loss of the downlink reference signal within the second preset time period is greater than or equal to the second preset path loss change threshold.

In an implementation of the present disclosure, optionally, before the network device receives the uplink reference signal sent by the terminal device according to the downlink reference signal and the preset change threshold, the method further includes: the network device receives second information sent by the terminal device, and the second information is used for the network device to determine a time for receiving the uplink reference signal according to the second information.

In an implementation of the present disclosure, optionally, S420 specifically includes: the network device receives the uplink reference signal sent by the terminal device through preconfigured reference signal resources according to the downlink reference signal and the preset change threshold.

In conjunction with FIGS. 2-6, the methods for uplink scheduling according to the implementations of the present disclosure have been described in detail above. A terminal device according to an implementation of the present disclosure will be described in detail below in conjunction with FIG. 7.

Figure 7:
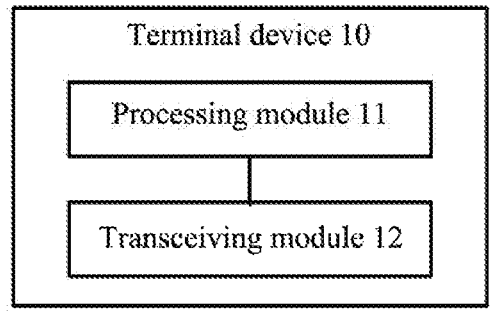
FIG. 7 is a block diagram of a terminal device according to an implementation of the present disclosure.

FIG. 7 is a block diagram of a terminal device according to an implementation of the present disclosure. As shown in FIG. 7, a terminal device 10 includes a processing module 11 and a transceiving module 12.

The processing module 11 is used for generating first information according to a downlink reference signal sent by a network device.

The transceiving module 12 is used for sending the first information to the network device, so that the network device determines a waveform to be adopted by the terminal device for performing uplink transmission according to the first information.

Therefore, according to the terminal device of the implementation of the present disclosure, the first information is generated according to the downlink reference signal sent by the network device, and the first information is sent to the network device, so that the network device determines the waveform to be adopted by the terminal device for performing uplink transmission according to the first information. Therefore, the terminal device may not send the uplink reference signal to the network device, and the energy consumption of the terminal device can be reduced.

In an implementation of the present disclosure, optionally, the processing module 11 is specifically used for generating the first information according to the downlink reference signal and a preset change threshold.

In an implementation of the present disclosure, optionally, the preset change threshold includes at least one of a first preset power change threshold, a first preset reception quality change threshold, and a first preset path loss change threshold.

In an implementation of the present disclosure, optionally, the processing module 11 is specifically used for generating the first information when it is determined that a decrease value of a receiving power of the downlink reference signal within a first preset time period is greater than or equal to the first preset power change threshold, and/or a decrease value of a reception quality of the downlink reference signal within the first preset time period is greater than or equal to the first preset reception quality change threshold, and/or an increase value of path loss of the downlink reference signal within the first preset time period is greater than or equal to first preset path loss change threshold.

In an implementation of the present disclosure, optionally, the first information is used for indicating that the terminal device moves from a position at a center of a cell to a position at an edge of the cell within the first preset time period.

In an implementation of the present disclosure, optionally, the preset change threshold includes at least one of a second preset power change threshold, a second preset reception quality change threshold, and a second preset path loss change threshold.

In an implementation of the present disclosure, optionally, the processing module 11 is specifically used for generating the first information when it is determined that an increase value of a receiving power of the downlink reference signal within a second preset time period is greater than or equal to the second preset power change threshold, and/or an increase value of a reception quality of the downlink reference signal within the second preset time period is greater than or equal to the second preset reception quality change threshold, and/or a decrease value of path loss of the downlink reference signal within the second preset time period is greater than or equal to the second preset path loss change threshold.

In an implementation of the present disclosure, optionally, the first information is used for indicating that the terminal device moves from a position at an edge of a cell to a position at a center of the cell within the second preset time period.

In an implementation of the present disclosure, optionally, the transceiving module 12 is specifically used for sending the first information to the network device through an uplink control channel.

In an implementation of the present disclosure, optionally, the transceiving module 12 is specifically used for sending the first information to the network device through an uplink control channel corresponding to preconfigured uplink control channel resources.

In an implementation of the present disclosure, optionally, after the transceiving module 12 sends the first information to the network device, the transceiving module 12 is further used for receiving second information sent by the network device, wherein the second information is used for instructing the terminal device to send an uplink reference signal to the network device; and sending the uplink reference signal to the network device according to the second information.

The terminal device according to the implementation of the present disclosure may refer to the flow of the method 100 for uplink scheduling which corresponds to the implementation of the present disclosure, and each unit/module in the terminal device and the other operations and/or functions described above are respectively for realizing the corresponding flow in the method 100, and will not be described here for brevity.

Figure 8:
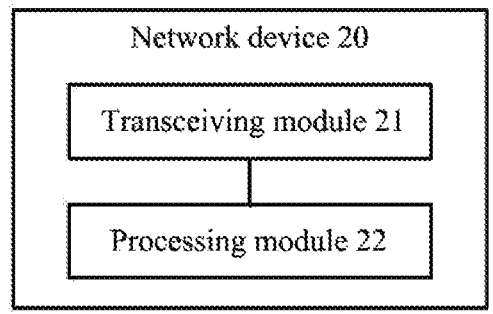
FIG. 8 is a block diagram of a network device according to an implementation of the present disclosure.

FIG. 8 is a block diagram of a terminal device according to an implementation of the present disclosure. As shown in FIG. 8, a network device 20 includes a transceiving module 21 and a processing module 22.

The transceiving module 21 is used for receiving first information sent by a terminal device, and the first information is generated by the terminal device according to a downlink reference signal sent by the network device.

The processing module 22 is used for determining a waveform to be adopted by the terminal device for performing uplink transmission according to the first information.

Therefore, according to the network device of the implementation of the present disclosure, the network device receives the first information generated by the terminal device according to the downlink reference signal and determines the waveform that the terminal device needs to adopt for performing uplink transmission according to the first information. Hence it is not necessary for the terminal device to send the uplink reference signal to the network device, and the energy consumption of the terminal device can be reduced.

In an implementation of the present disclosure, optionally, the first information is generated by the terminal device according to the downlink reference signal and a preset change threshold.

In an implementation of the present disclosure, optionally, the preset change threshold includes at least one of a first preset power change threshold, a first preset reception quality change threshold, and a first preset path loss change threshold.

In an implementation of the present disclosure, optionally, the first information is generated by the terminal device when determining that a decrease value of a receiving power of the downlink reference signal within a first preset time period is greater than or equal to the first preset power change threshold, and/or a decrease value of a reception quality of the downlink reference signal within the first preset time period is greater than or equal to the first preset reception quality change threshold, and/or an increase value of path loss of the downlink reference signal within the first preset time period is greater than or equal to first preset path loss change threshold.

In an implementation of the present disclosure, optionally, the first information is used for indicating that the terminal device moves from a position at a center of a cell to a position at an edge of the cell within the first preset time period.

In an implementation of the present disclosure, optionally, the preset change threshold includes at least one of a second preset power change threshold, a second preset reception quality change threshold, and a second preset path loss change threshold.

In an implementation of the present disclosure, optionally, the first information is generated by the terminal device when determining that an increase value of a receiving power of the downlink reference signal within a second preset time period is greater than or equal to the second preset power change threshold, and/or an increase value of a reception quality of the downlink reference signal within the second preset time period is greater than or equal to the second preset reception quality change threshold, and/or a decrease value of path loss of the downlink reference signal within the second preset time period is greater than or equal to the second preset path loss change threshold.

In an implementation of the present disclosure, optionally, the first information is used for indicating that the terminal device moves from a position at an edge of a cell to a position at a center of the cell within the second preset time period.

In an implementation of the present disclosure, optionally, the transceiving module 21 is specifically used for receiving the first information sent by the terminal device through an uplink control channel.

In an implementation of the present disclosure, optionally, the transceiving module 21 is specifically used for receiving the first information sent by the terminal device through an uplink control channel corresponding to preconfigured uplink control channel resources.

In an implementation of the present disclosure, optionally, the transceiving module 21 is further used for sending second information to the terminal device according to the first information, wherein the second information is used for instructing the terminal device to send an uplink reference signal to the network device; and receiving the uplink reference signal sent by the terminal device.

The processing module 22 is specifically used for determining a waveform to be adopted by the terminal device for performing uplink transmission according to the uplink reference signal.

The network device according to the implementation of the present disclosure may refer to the flow of the method 200 for uplink scheduling which corresponds to the implementation of the present disclosure, and each unit/module in the network device and the other operations and/or functions described above are respectively for realizing the corresponding flow in the method 200, and will not be described here for brevity.

Figure 9:
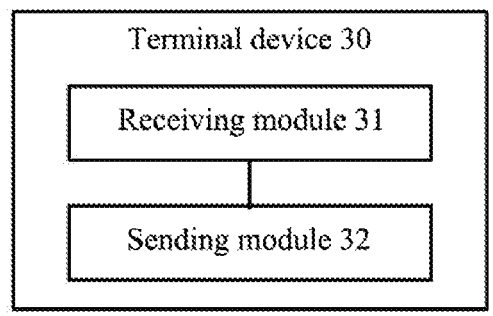
FIG. 9 is a block diagram of a terminal device according to another implementation of the present disclosure.

FIG. 9 is a block diagram of a terminal device according to another implementation of the present disclosure. As shown in FIG. 9, a terminal device 30 includes a receiving module 31 and a sending module 32.

The receiving module 31 is used for receiving a downlink reference signal sent by a network device.

The sending module 32 is used for sending an uplink reference signal to the network device according to the downlink reference signal and a preset change threshold.

Therefore, the terminal device of the implementation of the present disclosure sends the uplink reference signal to the network device according to the received downlink reference signal and the preset change threshold. Therefore, it is not necessary for the terminal device to continuously send uplink reference signals to the network device, the energy consumption of the terminal device is reduced, the network device can track the change of the uplink reference signal of the terminal device in time, and the accuracy of uplink scheduling is improved.

In an implementation of the present disclosure, optionally, the preset change threshold includes at least one of a first preset power change threshold, a first preset reception quality change threshold, and a first preset path loss change threshold.

In an implementation of the present disclosure, optionally, the sending module 32 is specifically used for sending the uplink reference signal to the network device when the terminal device determines that a decrease value of a receiving power of the downlink reference signal within a first preset time period is greater than or equal to the first preset power change threshold, and/or a decrease value of a reception quality of the downlink reference signal within the first preset time period is greater than or equal to the first preset reception quality change threshold, and/or an increase value of path loss of the downlink reference signal within the first preset time period is greater than or equal to first preset path loss change threshold.

In an implementation of the present disclosure, optionally, before sending the uplink reference signal to the network device, the sending module 32 is further used for sending first information to the network device, wherein the first information is used for the network device to determine a time for receiving the uplink reference signal according to the first information.

In an implementation of the present disclosure, optionally, the preset change threshold includes at least one of a second preset power change threshold, a second preset reception quality change threshold, and a second preset path loss change threshold.

In an implementation of the present disclosure, optionally, the sending module 32 is specifically used for sending the uplink reference signal to the network device when the terminal device determines that an increase value of a receiving power of the downlink reference signal within a second preset time period is greater than or equal to the second preset power change threshold, and/or an increase value of a reception quality of the downlink reference signal within the second preset time period is greater than or equal to the second preset reception quality change threshold, and/or a decrease value of path loss of the downlink reference signal within the second preset time period is greater than or equal to the second preset path loss change threshold.

In an implementation of the present disclosure, optionally, before sending the uplink reference signal to the network device, the sending module 32 is further used for sending second information to the network device, wherein the second information is used for the network device to determine a time for receiving the uplink reference signal according to the second information.

In an implementation of the present disclosure, optionally, the sending module 32 is specifically used for sending the uplink reference signal to the network device through pre-configured reference signal resources.

The terminal device of the implementation of the present disclosure may refer to the flow of the method 300 for uplink scheduling which corresponds to the implementation of the present disclosure, and each unit/module in the terminal device and the other operations and/or functions described above are respectively for realizing the corresponding flow in the method 300, and will not be described here for brevity.

Figure 10:
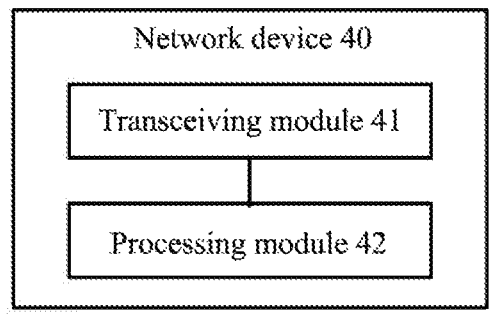
FIG. 10 is a block diagram of a network device according to another implementation of the present disclosure.

FIG. 10 shows a block diagram of a network device according to another implementation of the present disclosure. As shown in FIG. 10, a network device 40 includes a transceiving module 41 and a processing module 42.

The transceiving module 41 is used for sending a downlink reference signal to a terminal device.

The transceiving module 41 is further used for receiving an uplink reference signal sent by the terminal device according to the downlink reference signal and a preset change threshold.

The processing module 42 is used for determining a waveform to be adopted by the terminal device for performing uplink transmission according to the uplink reference signal.

Therefore, the network device according to the implementation of the present disclosure receives the uplink reference signal sent by the terminal device according to the downlink reference signal and the preset change threshold, and determines the waveform that the terminal device needs to adopt for uplink transmission according to the uplink reference signal. Therefore, it is not necessary for the terminal device to continuously send uplink reference signals to the network device, the energy consumption of the terminal device is reduced, and the network device can track the change of the uplink reference signal of the terminal device in time, thus improving the accuracy of the uplink scheduling.

In an implementation of the present disclosure, optionally, the preset change threshold includes at least one of a first preset power change threshold, a first preset reception quality change threshold, and a first preset path loss change threshold.

In an implementation of the present disclosure, optionally, the transceiving module 41 is specifically used for receiving the uplink reference signal sent by the terminal device when the terminal device determines that a decrease value of a receiving power of the downlink reference signal within a first preset time period is greater than or equal to the first preset power change threshold, and/or a decrease value of a reception quality of the downlink reference signal within the first preset time period is greater than or equal to the first preset reception quality change threshold, and/or an increase value of path loss of the downlink reference signal within the first preset time period is greater than or equal to first preset path loss change threshold.

In the implementation of the present disclosure, optionally, before receiving the uplink reference signal sent by the terminal device according to the downlink reference signal and the preset change threshold, the transceiving module 41 is further used for receiving first information sent by the terminal device, and the first information is used for the network device to determine a time for receiving the uplink reference signal according to the first information.

In an implementation of the present disclosure, optionally, the preset change threshold includes a second preset power change threshold, a second preset reception quality change threshold, and a second preset path loss change threshold.

In an implementation of the present disclosure, optionally, the transceiving module 41 is specifically used for receiving the uplink reference signal sent by the terminal device when the terminal device determines that an increase value of a receiving power of the downlink reference signal within a second preset time period is greater than or equal to the second preset power change threshold, and/or an increase value of a reception quality of the downlink reference signal within the second preset time period is greater than or equal to the second preset reception quality change threshold, and/or a decrease value of path loss of the downlink reference signal within the second preset time period is greater than or equal to the second preset path loss change threshold.

In an implementation of the present disclosure, optionally, before receiving the uplink reference signal sent by the terminal device according to the downlink reference signal and the preset change threshold, the transceiving module 41 is further used for receiving second information sent by the terminal device, and the second information is used for the network device to determine a time for receiving the uplink reference signal according to the second information.

In an implementation of the present disclosure, optionally, the transceiving module 41 is specifically used for receiving the uplink reference signal sent by the terminal device through preconfigured reference signal resources according to the downlink reference signal and the preset change threshold.

The network device according to the implementation of the present disclosure may refer to the flow of the method 400 for uplink scheduling which corresponds to the implementation of the present disclosure, and each unit/module in the network device and the other operations and/or functions described above are respectively for realizing the corresponding flow in the method 400, and will not be described here for brevity.

Figure 11:
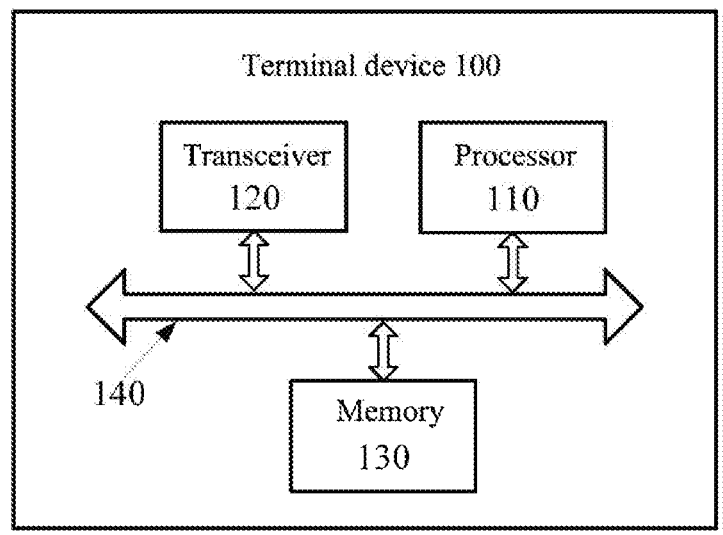
FIG. 11 is a block diagram of a terminal device according to yet another implementation of the present disclosure.

FIG. 11 is a terminal device according to yet another implementation of the present disclosure. As shown in FIG. 11, a terminal device 100 includes a processor 110 and a transceiver 120, the processor 110 and the transceiver 120 are connected. Optionally, the terminal device 100 further includes a memory 130 connected to the processor 110. And further optionally, the terminal device 100 includes a bus system 140. The processor 110, the memory 130 and the transceiver 120 may be connected through the bus system 140. The memory 130 may be used for storing instructions, and the processor 110 is used for executing the instructions stored in the memory 130 to control the transceiver 120 to send or receive information.

Specifically, the processor 110 is used for generating first information according to a downlink reference signal sent by a network device. The transceiver 120 is used for sending the first information to the network device, so that the network device can determine a waveform to be adopted by the terminal device for performing uplink transmission according to the first information.

The terminal device 100 of the implementation of the present disclosure may correspond to the terminal device 10 in the implementation of the present disclosure and may correspond to the terminal device performing the method 100 according to the implementation of the present disclosure, and each unit and module in the terminal device 100 and the other operations and/or functions described above are respectively for realizing the corresponding flow in the method 100, and will not be described here for brevity.

Therefore, the terminal device according to the implementation of the present disclosure generates the first information according to the downlink reference signal sent by the network device, and sends the first information to the network device, so that the network device determines the waveform to be adopted by the terminal device for performing uplink transmission according to the first information. Therefore, the terminal device may not send the uplink reference signal to the network device, and the energy consumption of the terminal device can be reduced.

Or, the transceiver 120 is used for receiving a downlink reference signal sent by the network device, and the transceiver 120 is further used for sending an uplink reference signal to the network device according to the downlink reference signal and a preset change threshold.

The terminal device of the implementation of the present disclosure may correspond to the terminal device 30 in the implementation of the present disclosure and may correspond to the terminal device performing the method 300 according to the implementation of the present disclosure, and each unit and module in the terminal device and other operations and/or functions described above are respectively for realizing the corresponding flow in the method 300, and will not be described here for brevity.

Therefore, the terminal device of the implementation of the present disclosure sends the uplink reference signal to the network device according to the received downlink reference signal and the preset change threshold. Therefore, it is not necessary for the terminal device to continuously send uplink reference signals to the network device, the energy consumption of the terminal device is reduced, the network device can track the change of the uplink reference signal of the terminal device in time, and the accuracy of uplink scheduling is improved.

Figure 12:
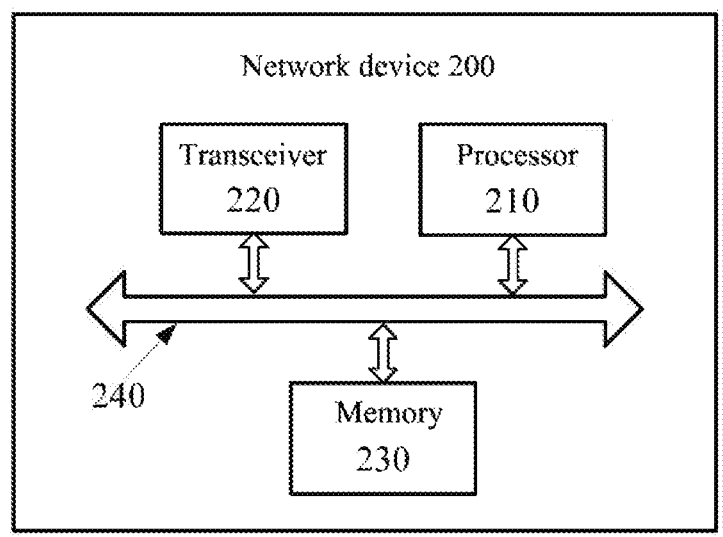
FIG. 12 is a block diagram of a network device according to yet another implementation of the present disclosure.

FIG. 12 is a block diagram of a network device according to yet another implementation of the present disclosure. As shown in FIG. 12, the network device 200 includes a processor 210 and a transceiver 220, the processor 210 and the transceiver 220 are connected. Optionally, the network device 200 further includes a memory 230 connected to the processor 210. And further optionally, the network device 200 includes a bus system 240. The processor 210, the memory 230 and the transceiver 220 may be connected through the bus system 240. The memory 230 may be used for storing instructions, and the processor 210 is used for executing the instructions stored in the memory 230 to control the transceiver 220 to send or receive information.

Specifically, the transceiver 220 is used for receiving first information sent by a terminal device, and the first information is generated by the terminal device according to a downlink reference signal sent by the network device. The processor 210 is used for determining a waveform to be adopted by the terminal device for performing uplink transmission according to the first information.

The network device of the implementation of the present disclosure may correspond to the network device 20 in the implementation of the present disclosure, and may correspond to the network device performing the method 200 according to the implementation of the present disclosure, and each unit and module in the network device and other operations and/or functions described above are respectively for realizing the corresponding flow in the method 200, and will not be described here for brevity.

Therefore, the network device in the implementation of the present disclosure receives the first information generated by the terminal device according to the downlink reference signal, and determines the waveform that the terminal device needs to adopt for performing uplink transmission according to the first information. Hence it is not necessary for the terminal device to send the uplink reference signal to the network device, and the energy consumption of the terminal device can be reduced.

Optionally, the transceiver 220 is used for sending a downlink reference signal to the terminal device, and the transceiver 220 is further used for receiving an uplink reference signal sent by the terminal device according to the downlink reference signal and a preset change threshold. The processor 210 is used for determining a waveform to be adopted by the terminal device for performing uplink transmission according to the uplink reference signal.

The network device of the implementation of the present disclosure may correspond to the network device 40 in the implementation of the present disclosure, and may correspond to the network device performing the method 400 according to the implementation of the present disclosure, and each unit and module in the network device and other operations and/or functions described above are respectively for realizing the corresponding flow in the method 400, and will not be described here for brevity.

Therefore, the network device according to the implementation of the present disclosure receives the uplink reference signal sent by the terminal device according to the downlink reference signal and the preset change threshold, and determines the waveform that the terminal device needs to adopt for uplink transmission according to the uplink reference signal. Therefore, it is not necessary for the terminal device to continuously send uplink reference signals to the network device, the energy consumption of the terminal device is reduced, and the network device can track the change of the uplink reference signal of the terminal device in time, thus improving the accuracy of the uplink scheduling.

It should be understood that in the above implementations of the present disclosure, the processor may be a central processing unit (CPU), or the processor may be other general purpose processor, digital signal processor (DSP), application specific integrated circuit (ASIC), off-the-shelf programmable gate array (FPGA) or other programmable logic device, discrete gate or transistor logic device, discrete hardware component, etc. The general purpose processor may be a microprocessor or the processor may be any conventional processor or the like.

The memory may include a read only memory and a random access memory, and provide instructions and data to the processor. A portion of the memory may also include a non-volatile random access memory. For example, the memory may also store device type information.

In the implementation process, the acts of the method implementations described above may be accomplished by integrated logic circuits of hardware in the processor or instructions in the form of software. The acts of the method disclosed in connection with the implementation of the present disclosure can be directly embodied by the execution of the hardware processor or by the execution of the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and accomplishes the acts of the above method in combination with its hardware. In order to avoid repetition, it will not be described in detail here.

It should be understood that references throughout the specification to "one implementation" or "an implementation" mean that a particular feature, structure, or characteristic related to the implementation is included in at least one implementation of the present disclosure. Therefore, "in one implementation" or "in an implementation" appearing throughout this specification may not necessarily refer to the same implementation. Furthermore, these particular features, structures, or characteristics may be combined in any suitable manner in one or more implementations.

It should be understood that, the term "and/or" herein is merely an association relationship describing associated objects, indicating that there may be three relationships, for example, a and/or b may indicate three situations: a alone, a and b, and b alone. In addition, the symbol "/" in this document generally indicates that objects of the former and the latter connected by "/" has an "or" relationship.

It should be understood that in various implementations of the present disclosure, the values of the sequence numbers in the above-mentioned processes do not indicate the order of execution, and the order of execution of various processes should be determined by its function and internal logic, and should not constitute any limitation on the implementation process of the implementations of the present disclosure.

Those of ordinary skill in the art will recognize that the method steps and units described in connection with the implementations disclosed herein can be implemented in electronic hardware, computer software, or a combination of the two. In order to clearly illustrate the interchangeability of hardware and software, the acts and components of the implementations have been described in a functional general manner in the above description. Whether these functions are implemented in hardware or software depends on the specific application and design constraints of the technical solution. One skilled in the art may use different methods to implement the described functions for each particular application, but such implementation should not be considered to be beyond the scope of the present disclosure.

The methods or steps described in connection with the implementations disclosed herein may be implemented in hardware, a software program executable by a processor, or a combination of the hardware and the soft program executable by the processor. The software program may be placed in a random access memory (RAM), a memory, a read-only memory (ROM), an electrically programmable read-only memory (EPROM), an electrically erasable programmable read-only memory (EEPROM), a register, a hard disk, a removable disk, a compact disc read-only memory (CD-ROM), or any other form of storage medium known in the art.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation, for example, multiple units or components may be combined or integrated into another system, or some features may be ignored or not executed.

The unit described as a separate unit may or may not be physically separated, and the component shown as a unit may or may not be a physical unit, i.e., it may be located in one place or may be distributed over multiple network units. Some or all of the units can be selected according to actual needs to achieve the purpose of the implementations.

In addition, various functional units in various implementations of the present disclosure may be integrated in one processing unit, or the units may be physically present separately, or two or more units may be integrated in one unit.

Although the present disclosure has been described in detail with reference to the accompanying drawings and in connection with preferred implementations, the present disclosure is not limited thereto. Those skilled in the art may make various equivalent modifications or substitutions to the implementations of the present disclosure without departing from the spirit and essence of the present disclosure, and such modifications or substitutions are intended to be within the scope of the present disclosure.

What we claim is:

1. A method for uplink scheduling, comprising:
generating, by a terminal device, first information according to a downlink reference signal sent by a network device, wherein the first information is used for the network device to determine a waveform to be adopted by the terminal device for performing uplink transmission, for indicating movement of the terminal device between a position at a center of a cell and a position at an edge of the cell, and for the network device to determine a moving direction of the terminal device;
sending, by the terminal device, the first information to the network device;
when the terminal device is in an area between the center and the edge of the cell, receiving, by the terminal device, second information set by the network device, wherein the second information is used for instructing the terminal device to send an uplink reference signal to the network device; and
sending, by the terminal device, the uplink reference signal to the network device based on the second information.

2. The method of claim 1, wherein generating, by the terminal device, the first information according to the downlink reference signal sent by the network device, comprises:
generating, by the terminal device, the first information according to the downlink reference signal and a preset change threshold.

3. The method of claim 2, wherein the preset change threshold comprises at least one of a preset power change threshold, a preset reception quality change threshold, or a preset path loss change threshold.

4. The method of claim 3, wherein generating, by the terminal device, the first information according to the downlink reference signal and the preset change threshold, comprises:
generating, by the terminal device, the first information when the terminal device determines at least one of the following:
a decrease value of a receiving power of the downlink reference signal within a preset time period is greater than or equal to the preset power change threshold,
a decrease value of a reception quality of the downlink reference signal within the preset time period is greater than or equal to the preset reception quality change threshold, or
an increase value of path loss of the downlink reference signal within the preset time period is greater than or equal to preset path loss change threshold.

5. The method of claim 4, wherein the first information is used for indicating that the terminal device moves from a position at a center of a cell to a position at an edge of the cell within the first preset time period.

6. The method of claim 3, wherein generating, by the terminal device, the first information according to the downlink reference signal and the preset change threshold, comprises:
generating, by the terminal device, the first information when the terminal device determines at least one of the following:
an increase value of a receiving power of the downlink reference signal within a preset time period is greater than or equal to the preset power change threshold,
an increase value of a reception quality of the downlink reference signal within the preset time period is greater than or equal to the preset reception quality change threshold, or
a decrease value of path loss of the downlink reference signal within the preset time period is greater than or equal to the preset path loss change threshold.

7. The method of claim 6, wherein the first information is used for indicating that the terminal device moves from a position at an edge of a cell to a position at a center of the cell within the preset time period.

8. The method of claim 1, wherein sending, by the terminal device, the first information to the network device, comprises:
sending, by the terminal device, the first information to the network device through an uplink control channel.

9. The method of claim 8, wherein sending, by the terminal device, the first information to the network device through the uplink control channel, comprises:
sending, by the terminal device, the first information to the network device through an uplink control channel corresponding to preconfigured uplink control channel resources.

10. The method of claim 1, wherein after the terminal device sends the first information to the network device, the method further comprises:
receiving, by the terminal device, second information sent by the network device, wherein the second information is used for instructing the terminal device to send an uplink reference signal to the network device; and
sending, by the terminal device, the uplink reference signal to the network device according to the second information.

11. A terminal device comprising a processor, a memory and a transceiver, wherein the memory is used for storing instructions, and the processor is used for calling the instructions stored in the memory to control the transceiver to receive or send information, and when the processor executes the instructions stored in the memory, the processor is enabled to:
generate first information according to a downlink reference signal sent by a network device, wherein the first information is used for the network device to determine a waveform to be adopted by the terminal device for performing uplink transmission, for indicating movement of the terminal device between a position at a center of a cell and a position at an edge of the cell, and for the network device to determine a moving direction of the terminal device;

send the first information to the network device;

when the terminal device is in an area between the center and the edge of the cell, receive second information sent by the network device, wherein the second information is used for instructing the terminal device to send an uplink reference signal to the network device; and send the uplink reference signal to the network device based on the second information.

* * * * *